March 3, 1970 G. W. GILLEMOT ET AL 3,499,102
PROTECTIVE COVER AND METHOD OF ANCHORING SAME
TO A SUPPORTING SURFACE
Filed Sept. 9, 1968

INVENTORS.
GEORGE W. GILLEMOT
JOHN T. THOMPSON

United States Patent Office 3,499,102
Patented Mar. 3, 1970

3,499,102
PROTECTIVE COVER AND METHOD OF ANCHORING SAME TO A SUPPORTING SURFACE
George W. Gillemot, Venice, Calif. (2331 20th St. Santa Monica, Calif. 90405), and John T. Thompson, Tarzana, Calif. (244 Loring St., Los Angeles, Calif. 90024)
Filed Sept. 9, 1968, Ser. No. 758,419
Int. Cl. H01b 17/00; H02g 3/04; H05k 5/03
U.S. Cl. 174—138
4 Claims

ABSTRACT OF THE DISCLOSURE

A protective cover and method of detachably anchoring the same to a supporting surface, as furniture, without defacing the surface or need to penetrate the surface with fastener devices. Typically, the technique is usable to conceal and anchor separable cable couplings for communication equipment to furnishings easily, expeditiously and without need for tools or defacement of walls, flooring, furniture or the like used as a support. Anchorage of the cover means is achieved by interlocking pairs of strips each having a layer of adhesive for anchoring the one on the supporting surface and the other on the underside of the cover, the facing surfaces of the strips being held detachably together by a multiplicity of barbs engageable with a mat of intertwined fibers. Desirably, the adhesive is of the pressure-sensitive type.

---

This invention relates to protective housing assemblies, and more particularly to a unique and improved housing assembly suitable for a wide range of applications typical among which is that of concealing and anchoring a cable coupling device detachably to a supporting surface without need for tools or the use of surface-penetrating type fasteners.

Illustrative of the many applications for which the principles and inventive concept of this invention are applicable is that of providing a concealing protective cover and anchorage for various items requiring a minimum of time and effort for installation and avoiding the need for tools or the risk of defacing the supporting surface, including choice room furnishings. For example, telephones and the like communication equipment, particularly in larger installations, utilizing multiple communication channels within the same building, require multiple conductor cabling different sections of which are connected together through separable coupling devices. Such coupling devices are bulky, unsightly and, in the interest of safety, require some means for concealing the same as well as for anchoring them to any conveniently available surface. Heretofore, such anchorage has included a wide variety of fastener devices necessitating other anchor expedients in the wall, floor or in the room furnishings. This involved defacement of the surfaces as well as the expenditure of considerable time by skilled workmen. Resort has also been had to permanent magnet mounting expedients but these are usable only in combination with a magnetic support surface. Additionally, such devices shatter readily, are easily shifted crosswise of the mounting surface and mar, scratch and otherwise deface surface finishes.

The present invention overcomes the foregoing and other serious objections to previously proposed anchoring facilities and provides a rugged, inexpensive cover and anchorage technique installable in seconds by unskilled workmen and readily removed or transferred to a different location without leaving scars or injuring the former mounting surface or requiring refinishing thereof. The new technique proposes a simple cover having a cavity large enough to conceal the object to be protected and securable to the mounting surface by pressing the cover unit against the surface. Anchorage is dependent on the presence on the underside of the cover of a strip of a type mateable with a companion strip detachably adherent to the support surface, the materials of the two strips having interlocking barbs and fibers. These interlock with one another under slight pressure and are separable by prying the one away from the other. If the strips are coated with pressure sensitive adhesive, as is preferable, the anchor strips may be quickly transferred from one location to another without blemishing or defacing the former mounting surface.

Accordingly, it is a primary object of the present invention to provide a unique and simplified mode and method for concealing and anchoring an object in a desired location without need for tools or tool-operated fastener devices.

Another object of the invention is the provision of an improved article of manufacture useful to conceal and anchor an object, such as cabling, coupling devices and the like, to a supporting surface utilizing interlocking separable pairs of strips one of which is adhesively securable to the supporting surface and the other to the underside of the cover means.

Another object of the invention is the provision of simple, inexpensive, rugged means for anchoring fittings, cable coupling assemblies and the like to room furnishings, the wall or the floor without need for penetrating the surface with fasteners and which anchorage assembly is readily transferrable to a different location without damage to the former supporting surface.

These and other more specific objects will appear upon reading the following specification and claims and upon considering in connection therewith the attached drawings to which they relate.

Referring now to the drawings in which preferred embodiments of the invention are illustrated:

Figure 1:
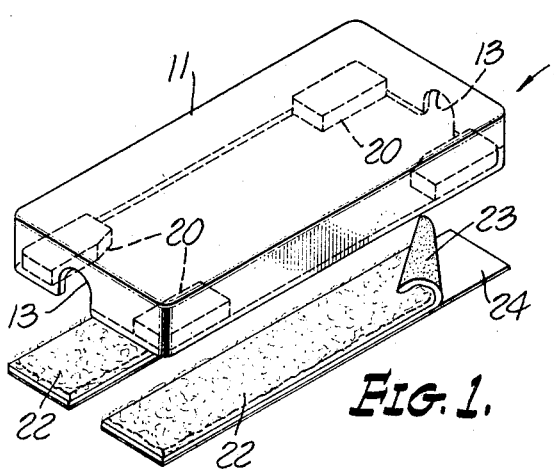
FIGURE 1 is an exploded view of a typical preferred embodiment of the invention, showing the components in a typical installing position.
Figure 2:
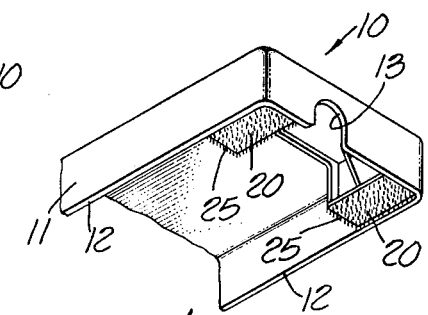
FIGURE 2 is a fragmentary perspective view from the underside of the cover shown in FIGURE 1 and illustrating constructional details.
Figure 3:
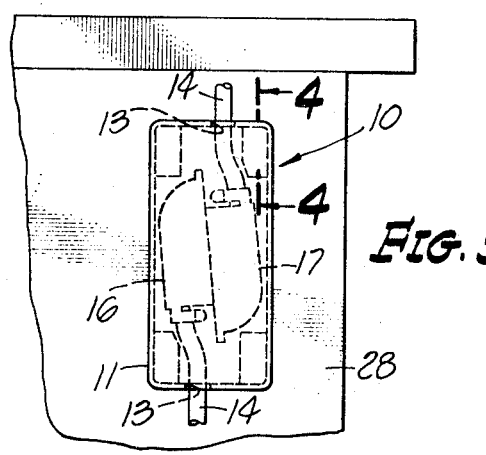
FIGURE 3 is a fragmentary elevational view showing one illustrative installation of the invention to anchor cabling against the side of furniture.
Figure 4:
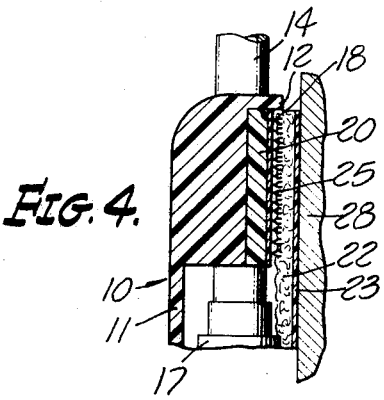
FIGURE 4 is a fragmentary sectional view on an enlarged scale taken along line 4—4 on FIGURE 3.

Referring more particularly to FIGURES 1 through 4, there is shown one preferred illustrative embodiment of the invention, designated generally 10, typically comprising a one-piece cup-shaped housing 11 having its rim edges 12 lying in a common plane. The cover side wall is notched as indicated at 13, 13 in a size and shape to fit snugly about the body of cabling 14, 14. As here shown, the cable ends are attached to separable coupling halves 16, 17 of any suitable construction well known in the cable coupling art.

One of the halves is fitted with a separate pin connected to a respective cable conductor whereas the conductors of the other cable end are coupled to pin-seating sockets located in the other coupling half and positioned to mate with the pins.

As herein shown, the interior corner portions of cover 11 are provided with shallow recesses 18 parallel to but spaced inwardly from the rim edge 12 sufficiently to accommodate one of a pair of cooperating fastener strips 20. The other of the mounting strips, designated 22 in FIGURE 1, comprises a mat of intertwined fibers having a layer of adhesive 23 secured to its rear side. Desirably, adhesive 23 is of the pressure-sensitive type protected until ready for application to a mounting surface by a readily removable waxy strip 24. Mating strip 20 is likewise provided with an adhesive backing of the same character as layer 23, and prior to application to surfaces 18 of the cover, it is likewise protected with a removable strip corresponding to strip 24.

Strip 20 is provided on the face opposite the adhesive layer with a multiplicity of minute closely spaced barbs or hooks or tough resilient materials, as plastic. These hooks readily penetrate into and interlock with the fibers of mat 22. Despite this interlocking action the cover can be pried or separated from fibers 22 by leverage applied to one end of the cover and effective to separate the engaged barbs and fibers by deforming the barbs out of locking engagement.

As illustrative of the particular application of the invention, let it be assumed that it is desired to conceal and anchor cable coupling 16, 17 against one end wall of a table or office desk 28. Cover 11 is normally manufactured with strips 20 of one of the fastener devices installed on its underside and cut to an appropriate size. According to one mode of installation the operator inserts the assembled coupling 16, 17 within the cover and seats cables 14, 14 in a respective one of notches 13, 13. This having been done, the operator peels away the adhesive protective strips 24 exposing the pressure sensitive layer 23 and presses the cover assembly 10 against the selected supporting surface.

Other installers prefer to omit the cable and coupling assembly from the cover while securing one of the strips 20 or 22 to the supporting surface. Once this has been done, the coupling is installed within the cover and then the latter is placed over and pressed against the strip until barbs 25 interlock with fibers of mat 22. If at any time a serviceman needs access to the coupling, it is a simple matter to place the fingertips beneath the rim edge 12 at one end of the housing and pry it loose from fibers 22. After the servicing operation has been completed the parts are reassembled in the same manner as described above. The cover may be removed and reassembled repeatedly without losing the effectiveness of the fibers or the barbs engageable therewith.

If it is necessary to move cable to a different location or to support it on a different piece of furniture or wall surface, cover 11 is detached in the manner just described and strips 22, 22 are peeled away by lifting one end and then transferred to the new supporting surface. If any of the pressure sensitive adhesive adheres to the old surface it is easily removed by brisk rubbing and does not mar, tear or cause any discoloration or defacement of the finish to which it formerly adhered.

Figure 6:
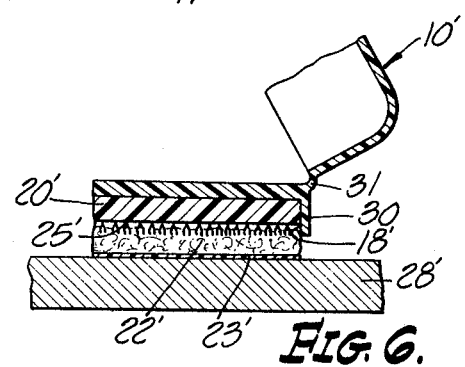
FIGURE 6 is a fragmentary sectional view on an enlarged scale taken along line 6—6 on FIGURE 5.
Figure 5:
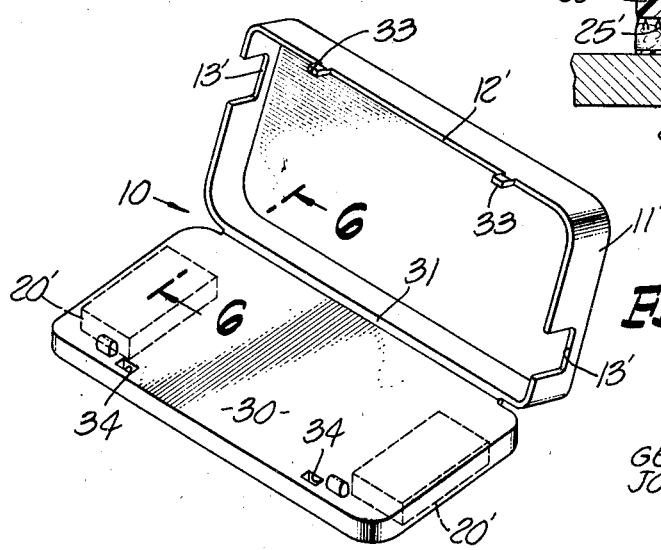
FIGURE 5 is a perspective view of a second form of the invention cover assembly.

An alternate embodiment of the closure device is shown in FIGURES 5 and 6 wherein the same or equivalent parts are designated by the same reference characters distinguished by a prime. Cover assembly 10' differs primarily in that it is formed in two halves including a cover half 11' and a base half 30 molded in one piece from suitable thermoplastic material and hingedly connected by a thin flexible web 31 between adjacent edges. In this embodiment one of the strips 20' of the interlocking pair is secured to mounting surfaces provided on the underside of base 30 rather than to the underside of cover 11'. The latter may be held closed by resilient tangs 33 resiliently interlocking with detents 34 formed in base 30 and positioned to register with tangs 33.

It will be understood that the second embodiment is used in the same manner described above in connection with FIGURES 1 to 4, the principal difference being that strips 20', 22' remain assembled and interlocked with one another until such time as it is desirable to transfer the protective assembly 10' to a different location. It is therefore clear that access cover 11' can be opened and reclosed repeatedly while servicing the parts concealed therewithin without disturbing the assembled interlocking position of tangs 25' with the fibers of mat 22'.

While the particular protective cover and method of anchoring same to a supporting surface herein shown and disclosed is fully capable of attaining the objects and providing the advantages hereinbefore stated, it is to be understood that it is merely illustrative of the presently preferred embodiments of the invention.

We claim:

1. An article of manufacture comprising a protective cover assembly and a set of mounting supports therefor adapted to be installed and readily transferred to a different installed position against furniture, walls, floors and the like support surfaces without need for tools and without defacing the support surface or its finish while concealing and releaseably anchoring to the support surface a separate coupling assembly interconnecting the adjacent ends of a telephone service cable, said article of manufacture comprising: a shallow rectangular one-piece plastic cover having notches in its opposite end edges sized to releaseably seat one of a pair of communication cable ends each equipped with one of a pair of separable terminal couplings, the interior of said cover being sized to snugly house the mated terminal couplings, said set of mounting supports comprising a plurality of pairs of repeatedly separable mounting plaques, one plaque of each pair being bonded to spaced apart areas of the rear rim edges of said cover and the other plaque of each pair having a pressure sensitive adhesive coating adapted to adhere separably to painted surfaces without defacing the same, and the adjacent surfaces of said pairs of plaques being provided one with a mat of intertwined fibers and the other with a multiplicity of flexible barbs adapted to penetrate between and interlock releaseably with the intertwined fibers of the other plaque, and said plaques having said coating of pressure sensitive adhesive being mountable in a selected position on a support surface while interlocked with their respective cooperating plaques by applying pressure to the front face of said cover to press the exposed pressure sensitive coatings against a support surface.

2. An article of manufacture as defined in claim 1 characterized in that said protective cover assembly has front and rear halves hingedly coupled to one another along one longer pair of edges, and one plaque of said pairs of plaques being bonded to the rear surfaces of the rear half of said cover assembly.

3. An article of manufacture as defined in claim 2 characterized in that said halves are formed in one piece from thermoplastic material and including a thin flexible web interconnecting said one pair of edges and providing a hinge member therebetween.

4. That method of concealing and anchoring a multi-conductor cable and attached coupling device to furniture and the like finished surfaces irrespective of the metallic or non-metallic character thereof without defacing the same and without need for tools or surface-penetrating fastener devices while leaving the cable coupling accessible for inspection and servicing merely by applying a lifting force to one adge of a cover for the coupling device, which method comprises: providing a protective cover having a cavity large enough to receive the cable coupling device and notch means for seating over the cable, applying one of a pair of adhesively coated strips of interlocking barbs and fibers to the support surface and applying the other of said pair of coated strips to the underside of said protective cover, inserting the mated cable coupling device in said cover with the cable seated in said notch means, and pressing this assembly against the support surface to engage the barbs and fibers of said pair of strips to anchor the protective cover and its contents firmly but detachably to the support surface.

(References on following page)

References Cited

UNITED STATES PATENTS

| | | | | |
|---|---|---|---|---|
| 2,855,578 | 10/1958 | Hirsch | | 339—36 |
| 3,106,602 | 10/1963 | Hartz. | | |
| 3,240,456 | 3/1966 | Hartman | | 174—48 X |
| 3,321,068 | 5/1967 | Beach | | 248—205 X |
| 3,350,045 | 10/1967 | Mayers. | | |
| 3,370,818 | 2/1968 | Perr | | 248—205 |
| 3,417,192 | 12/1968 | Elm | | 339—198 X |

LARAMIE E. ASKIN, Primary Examiner

U.S. Cl. X.R.

174—48, 66; 248—205; 339—36